(12) United States Patent
Byers et al.

(10) Patent No.: US 6,774,507 B1
(45) Date of Patent: Aug. 10, 2004

(54) RELIABLE DC POWER SUPPLY

(75) Inventors: Charles Calvin Byers, Wheaton, IL (US); Arthur Francis Kirk, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/400,012

(22) Filed: Mar. 26, 2003

(51) Int. Cl.[7] .............................................. H02M 1/12
(52) U.S. Cl. ........................ 307/64; 307/125; 307/130
(58) Field of Search ..................... 307/69, 125, 130, 307/131

(56) References Cited

U.S. PATENT DOCUMENTS 5,657,214 A * 8/1997 Nguyen et al. ............... 363/41
6,157,308 A * 12/2000 Byers ........................... 340/635
6,198,178 B1 * 3/2001 Schienbein et al. ........... 307/82
6,608,404 B2 * 8/2003 Schienbein et al. ........... 307/82

* cited by examiner

Primary Examiner—Bao Q. Vu

(57) ABSTRACT

A highly reliable power supply comprises two independent input power train units each connected to a separate primary winding of a common transformer, and an output power train unit connected to the secondary winding of the transformer. A control unit controls how much energy each of the input power train units supplies. Each of the input power train units is connected to a different source of battery power or a different power distribution bus. Advantageously the advantages of full duplication of a power supply are obtained while duplicating only the input power train units. The input power train units are effectively isolated from each other through being connected to separate windings of the transformer.

16 Claims, 4 Drawing Sheets

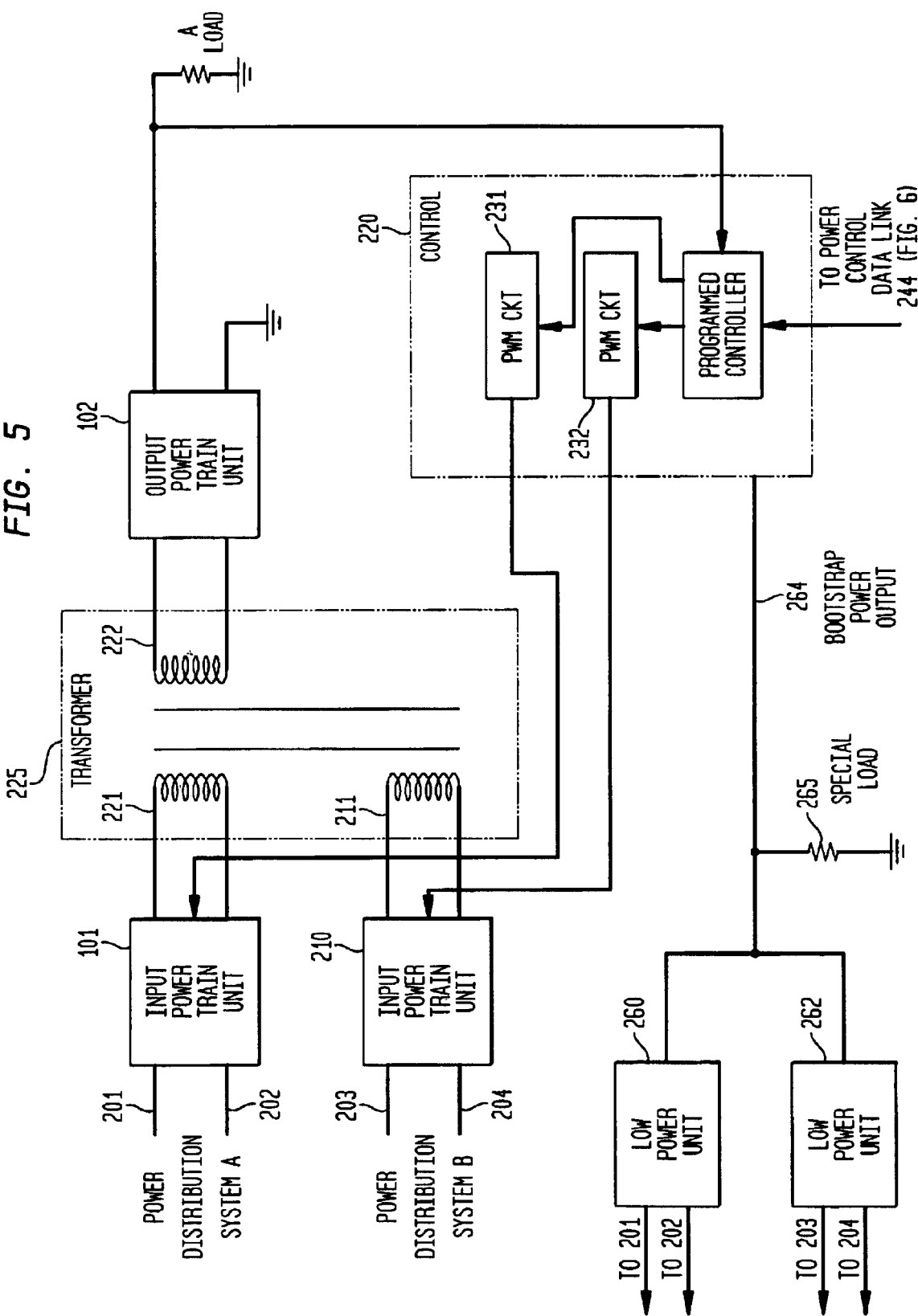

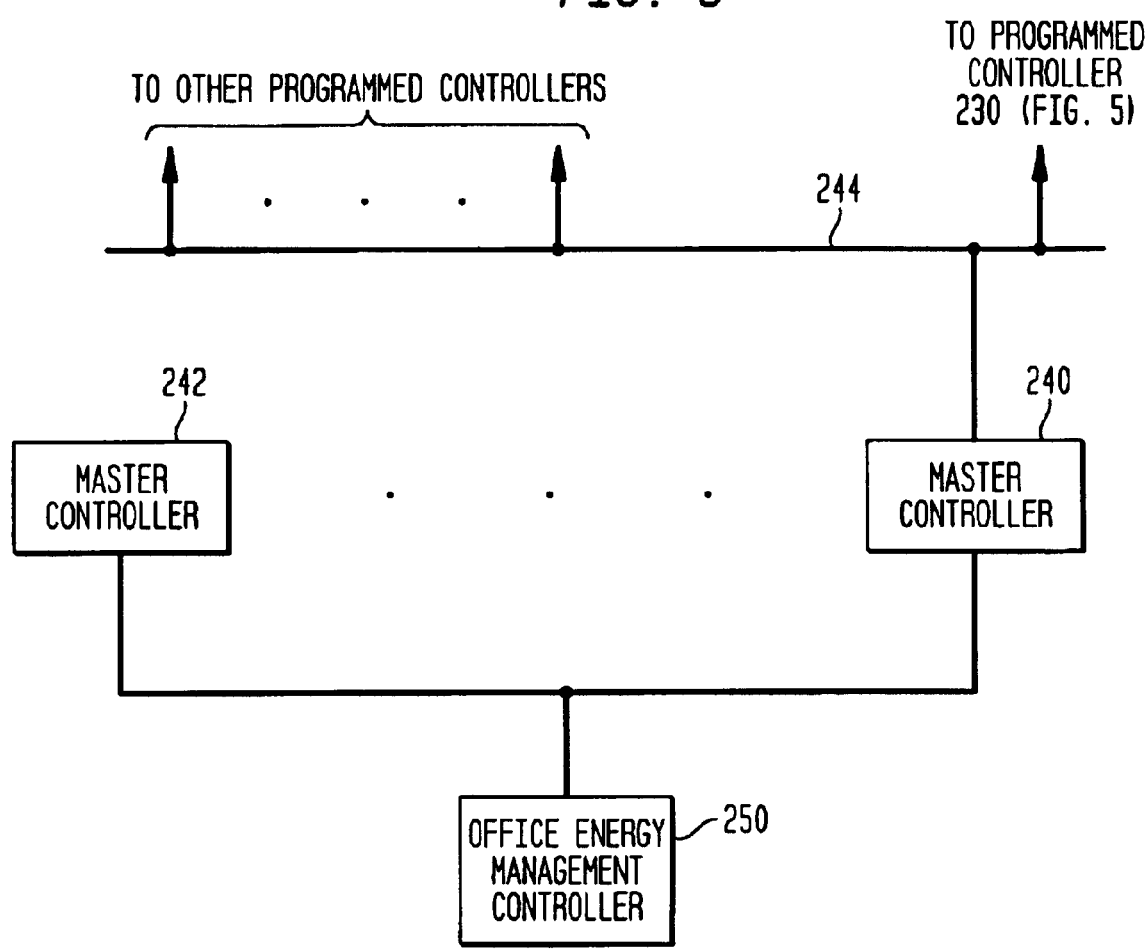

RELIABLE DC POWER SUPPLY

TECHNICAL FIELD

This invention relates to highly reliable power supplies and more specifically to highly reliable board mounted power modules.

BACKGROUND OF THE INVENTION

As a result of the increasing scale of integration which has been encountered during the past decades, a very large amount of circuitry can be mounted on a single circuit board. The amount of this circuitry is so great that every effort must be made to avoid a failure of a circuit board. As an example of a circuit board which contains a large body of critical circuitry, there is the case of a circuit board used as an interface for DS3 signals in a telecommunications network using digital (pulse code modulation) signals. This single board interfaces 672 voice channels. The loss of all these channels is, of course, highly undesirable.

A major weak link in any such circuit board is the power supply. Typically, each such board has its own power supply driven from a single battery source.

In the prior art, the most common arrangement for providing this highly reliable power is to have two separate power supplies and to simply parallel their outputs. If one power supply fails, power is still provided from the other supply. This is expensive in material cost and in board area. This arrangement has been used, for example, in the above-mentioned board for interfacing with DS3 signals in the No. 4ESS® formerly manufactured by Lucent Technologies Inc.

To provide fault isolation, diodes may be inserted between the two power supplies and the load. A problem with this arrangement is that it is very difficult to detect diode failures, and it is therefore a source of potential problem if other failures occur. This particular problem has been solved in accordance with the teachings of U.S. Pat. 6,157,308 which places the isolating diodes in close proximity to a controllable heater source and observing the voltage across the diode when the diode is heated.

Another problem related to diodes is that the two power system's return currents can intermix, causing potential isolation issues which in turn can reduce system reliability.

Both of the above arrangements are expensive and still have the disadvantage that problems in one of the duplicated power supplies cannot be fully isolated from the other power supply and can cause the board to fail.

SUMMARY OF THE INVENTION

The above problems are essentially solved and an advance is made over the teachings of the prior art in accordance with this invention wherein redundancy is introduced into a single power supply by duplicating the input power train of one power supply and feeding each of the duplicated power trains to two separate primary windings of a three winding transformer. The secondary (or third winding) of the transformer is then connected to the output power train.

Advantageously, this arrangement fully isolates the two input power trains of the power supply from each other (since they are connected to separate windings of the power transformer) and requires only a single output power train.

Advantageously, this arrangement costs only about 30 percent more than a single power supply and is therefore much less expensive than a pair of power supplies provided for duplication and isolation purposes.

Advantageously, redundancy is achieved without the use of diodes and at the same time the arrangement offers superb fault isolation capabilities.

In accordance with Applicants' preferred embodiment, the power supply is controlled by a program controlled controller. This controller provides a pair of signals, one for each of the input power trains, to control the amount of energy that each input power train supplies to the primaries of the transformer. The controller can be arranged to have the power supply draw all input current from only one of the input power trains connected to one of the battery distribution systems. This is desirable if one of the input power sources fails or is removed from service for maintenance. In case a unit has been placed in the maintenance mode and there is a failure in the power system currently driving that unit, then the controller can automatically revert to a state in which the non-failing power distribution system is used.

The controller can also be arranged to draw equal energy from each of the input power trains; this mode of operation increases the lifetime of the power supply since then under normal conditions, each single power supply is operating at 50% loading capacity. In equal energy mode, the current drawn from each power source is inversely proportional to its voltage. In a second mode—equal current, the two input power trains draw identical current from both sources, regardless of their voltage. An advantage with this mode is that currents are evenly distributed in the DC distribution system. Voltage transients are also minimized when the load current changes from two power sources to one.

The controllers can also be used to detect alarm signals by detecting over- or under-voltage or current.

In accordance with one preferred embodiment, a group of controllers are interconnected by a data link and are connected through that data link to a master controller (for controlling, for example, a shelf of circuit boards). Such master controllers, in turn, can be interconnected by another data link and connected to an office energy management controller for controlling an entire system.

Advantageously, communications among the control circuits can be used for passing alarm signals or balancing the load between the two power distribution systems, across collections of multiple boards, shelves or frames, and to respond to maintenance requests.

A problem of the type of power supplies illustrated in the preferred embodiment is that when a system or a board is started up, it is necessary to provide power to a board controller to bootstrap the main power system's controller and other small loads on the board. In accordance with Applicants' preferred embodiment this power supply is duplicated, each unit being connected to one of the two power distribution feeders. These power units, which typically supply only about 10 watts, have duplicated, isolated inputs and paralleled outputs, and are used to power the control unit.

BRIEF DESCRIPTION OF THE DRAWING(S)

FIG. 5 is a more detailed block diagram of a unit in accordance with Applicants' invention; and FIG. 6 is a block diagram illustrating interconnections among power units.

DETAILED DESCRIPTION

Figure 1:
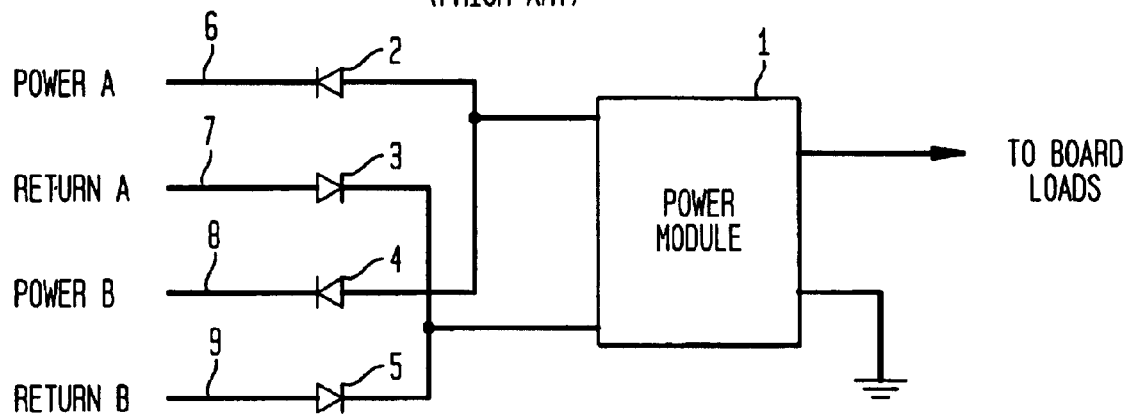
FIG. 1 is a simplified block diagram of a simplex unit of a type known in the prior art.

FIG. 1 is a simplified diagram of a simplex prior art power system. Power is supplied from a first source (6, 7) and a second source (8, 9). The duplicated power feed protects against a failure of one of the power feed systems, and the isolation diodes (2, 3, 4, 5) prevent a failure of one of the power feed systems from affecting the other. The power module (1) is described in more detain in FIG. 4.

Figure 2:
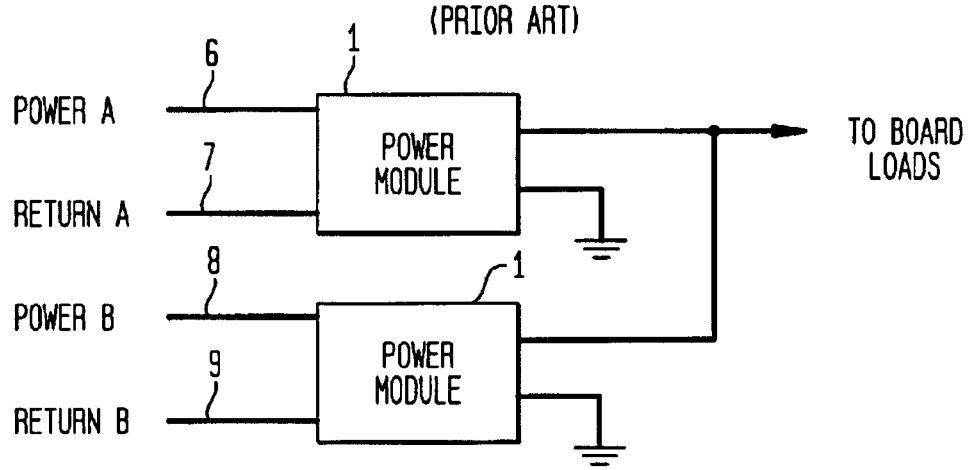
FIG. 2 is a simplified block diagram of a duplex unit of the prior art.

FIG. 2 is a simplified diagram of a duplex prior art power supply using the same power module (1) as in FIG. 1. This arrangement protects against a failure of one of the power modules, as well as protecting against a failure of one of the power feed systems. It does not incur the problems associated with diodes, but does require paying the cost of two complete power modules.

Figure 3:
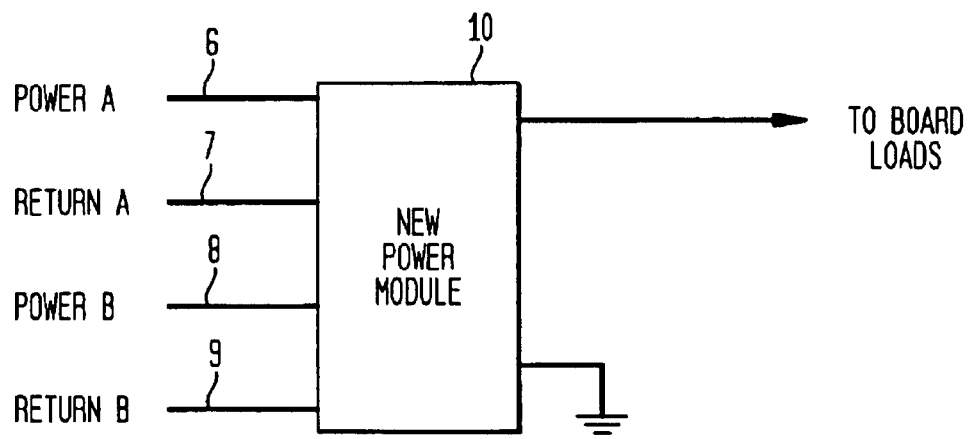
FIG. 3 is a simplified block diagram of a unit in accordance with Applicants' invention.

FIG. 3 is a simplified diagram of a power supply system using a new power module (10) in accordance with Applicants' invention. The new power module (10) is fed by both of the power supply feed systems, and uses a transformer to protect each of the power supply feed systems against a failure in the other.

Figure 4:
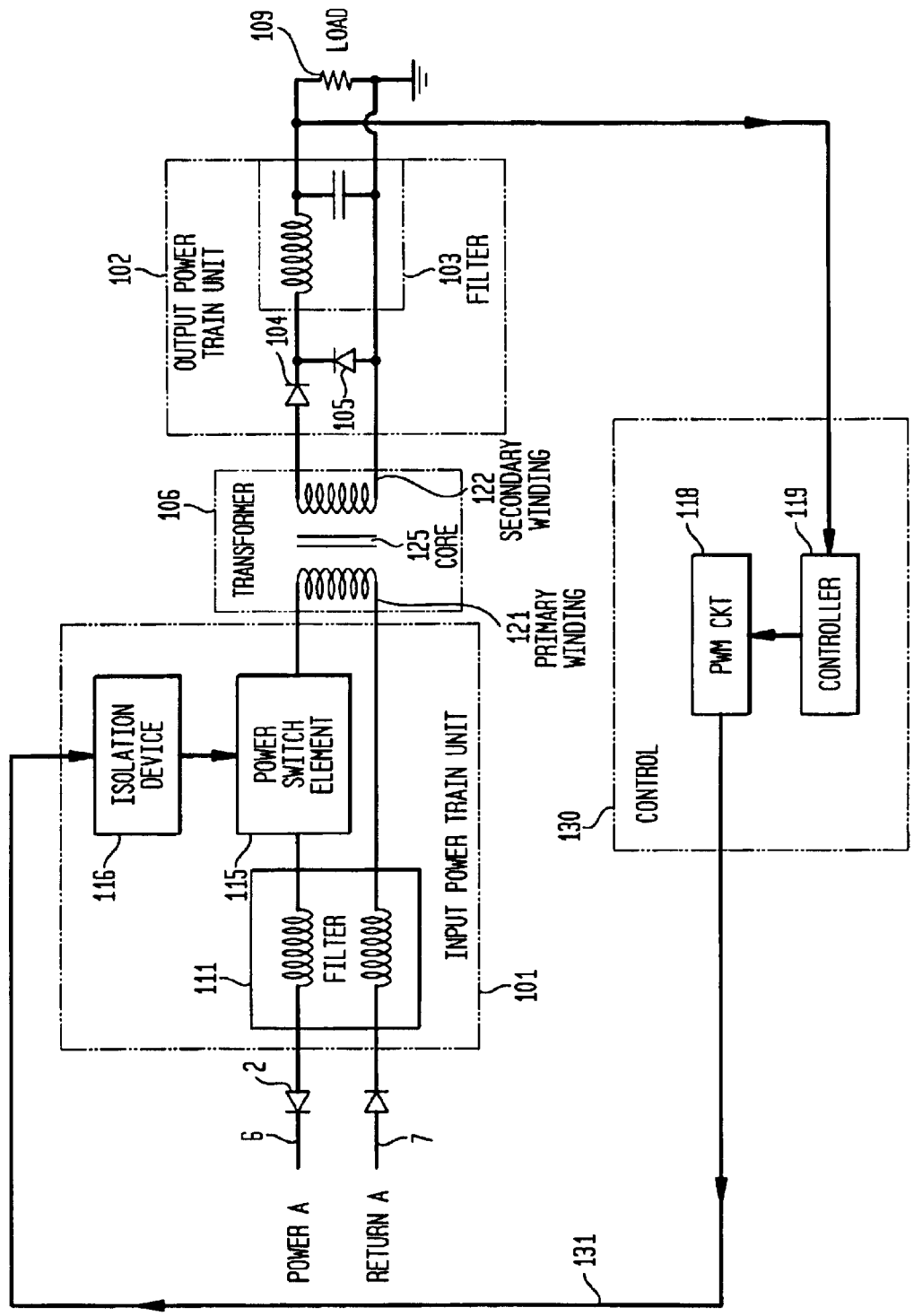
FIG. 4 is a more detailed block diagram of a prior art simplex unit.

FIG. 4 is a block diagram of a simplex power supply of a type well known in the prior art. This type of unit is discussed extensively, for example, in C. Y. Zhao et al.: "Secondary Side Synchronous Post Regulator Provides Precision Regulation And High Efficiency For Multiple Output Isolated Power Supplies", *Linear Technology*. vol. 12, no. 4, pp. 28–32, December 2002. Only those elements of the power supply necessary for understanding the architecture of Applicants' invention are shown. An input power train (101) connected to a source of power at its input and connected to a winding of a transformer at its output, is controlled by lead (131) from controller (130). The input power train provides energy to the primary winding (121) of transformer system (106). The amount of energy transferred from the input power train (101) to the output power train (102), is controlled by a pulse width modulation (PWM) signal from unit (118) within control (130); this signal via lead (131) drives an isolation device (116) such as a light emitting diode, a transformer, or a capacitor, which in turn controls a power switch element (115) that opens or closes a connection from filter (111) to primary winding (121) in response to the PWM control signal from controller (130). The reason for using an isolation device (116) is to provide isolation between the control unit (130) and the power switch element (115) controlling the insertion of energy into primary winding (121).

The output of transformer unit (106) is connected to an output power train (102) whose output is connected to the load (109) being powered by the power unit The output winding (122) of the transformer is connected to a pair of rectifying diodes (104) and (105) whose outputs are connected to a filter (103) and thence to the load (109). The control unit (130), controlled by controller (119), provides feedback from the output of the output power train and the signal that is received from this output is used to modulate the PWM circuit (118) which as previously described controls the amount of energy supplied by the input driver to primary winding (121) and produces the desired output voltage at load (109).

FIG. 5 is a block diagram illustrating Applicants' invention. In addition to input power train (101) and output power train (102), a second input power train (210) similar to input power train (101) has been added. Input power train (210) is connected to a second primary winding of a transformer (225). Transformer (225) now has two primary windings (221) and (211) and one output winding (222). The control (220) now is required to control two separate input power trains, units (101) and (210). Consequently, control (220) has two PWM units (221) and (222) for driving these two input power trains. Advantageously, this overall arrangement isolates the two input power trains from each other, and from the output power train, and permits both input power trains, on a load sharing basis or individually, to drive the output power train (102).

Control unit 220 is controlled by a programmed controller. When the power unit is initially turned on, it is necessary to bootstrap the control unit (220). This is accomplished with the help of a special source of power. This source is also highly reliable being supplied by duplicated low power units (260) and (262) whose outputs are fed to the control unit (220) over bootstrap power output (264). Bootstrap power output (264) permits a small amount of power to be sent to some additional loads on the board that need to operate even though the main output power train (102) is de-energized. This power is valuable for running small, continuous loads (265), for example, real-time clocks. The two low power units receive power from the two power distribution buses (201, 202) and (203, 204). The bootstrap arrangement allows the programmed controller to access the power control data link to receive instructions from a master controller (240) (discussed below). Each of the two bootstrap power units (260, 262), can supply enough power to drive control circuit (220).

FIG. 6 illustrates that the programmed controller is connected to a power control data link (244) which permits the programmed controller to communicate with similar units also connected to the power control data link. Information exchanged between the programmed controllers can indicate the desirability of, for example, taking more power from the power distribution source supplying input power train (101). The power control data link can also communicate with a master controller (240) to convey information such as an alarm indication, indications that one or both power distribution sources have too high or too low a voltage, power outage, temperature, output current. In addition, a plurality of master controllers 240, . . . ,242 are connected via another data link (252) to an office energy management controller (250) for overall control of the power system for an entire wirecenter.

While the preferred embodiment shows two input power trains and two primary windings, an alternative embodiment can use three (or more) input power trains and primary windings, for still higher reliability, especially if three or more main power distribution systems exist.

In Applicants' preferred embodiment, the power control data link is an industry standard IIC bus. The output voltage is 12 volts and the acceptable input voltage is in the range of 36 to 72 volts.

The above description is of one preferred embodiment of Applicants' invention. Other embodiments will be apparent to those of ordinary skill in the art without departing from the scope of the invention. The invention is limited only by the attached claims.

We claim:

1. A highly reliable direct current (DC) power supply unit comprising:

a transformer having a first and a second primary winding and one secondary winding;

a first input power train unit for converting DC into a first pulse width modulated (PWM) signal, said first input power train connected to a first source of power, the output of said first power train unit being connected to said first primary winding of said transformer;

a second input power train unit for converting DC into a second pulse width modulated (PWM) signal, said second input power train connected to a second source of power, the output of said second power train unit being connected to said second primary winding of said transformer;

an output power train unit connected to a secondary winding of said transformer, said output power train receiving an input from said secondary winding and converting said input into a reliable DC output power sources;

wherein said transformer provides DC isolation between said first source of power and said second source of power.

2. The apparatus of claim 1 further comprising a controller for controlling said first and said second power train units to supply energy to said first and said second primary winding.

3. The apparatus of claim 2 wherein said controller operates under program control and is arranged to provide separate signals to said first and said second power train units and to vary an amount of energy supplied by said first and said second power train units.

4. The apparatus of claim 2 further comprising a duplicated power supply for supplying power to said controller.

5. The apparatus of claim 4 wherein said duplicated power supply for said controller supplies power for initial bootstrap operation when said reliable power supply is turned on.

6. The apparatus of claim 2 wherein control leads for controlling said first and said second power train unit are isolated from said controller supplying said control signal.

7. The apparatus of claim 2 further comprising a data bus connected to said controller for communicating with controllers of other reliable power supply units.

8. The apparatus of claim 2 further comprising a data bus connected to said controller for communicating with a master controller for controlling a plurality of controllers of reliable power supplies.

9. The apparatus of claim 8 further comprising an office energy management controller for communicating with and for controlling a plurality of master controllers.

10. The apparatus of claim 8, wherein said controller monitors power usage and transmits the monitored information to said master controller.

11. The apparatus of claim 2 wherein said controller is used for detecting alarm conditions.

12. The apparatus of claim 11 wherein a data bus connected to said controller transmits alarm indications to a master controller for controlling a plurality of controllers of reliable power supplies.

13. The apparatus of claim 2 wherein said controller controls said first and said second power train units to supply equal energy.

14. The apparatus of claim 2 wherein said controller controls said first and said second power train units to supply all energy from only one of said first and said second power train units.

15. The apparatus of claim 14 wherein said controller automatically causes the other of said first and said second power train units to supply all energy if said one power train fails.

16. The apparatus of claim 2 wherein said controller controls said first and second power train units to supply equal current.

* * * * *